(12) United States Patent
Tsui et al.

(10) Patent No.: US 8,504,005 B2
(45) Date of Patent: Aug. 6, 2013

(54) CONTROLLING AND MITIGATING DROPPED COMMUNICATIONS

(75) Inventors: Ernest Tsui, Pleasanton, CA (US); Choonghor Woon, Highlands Ranch, CO (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 13/154,137

(22) Filed: Jun. 6, 2011

(65) Prior Publication Data

US 2012/0309445 A1 Dec. 6, 2012

(51) Int. Cl.
*H04B 7/00* (2006.01)
*H04B 1/00* (2006.01)
*H04B 7/185* (2006.01)

(52) U.S. Cl.
USPC ......... 455/418; 455/522; 455/127.5; 370/318

(58) Field of Classification Search
USPC ... 455/522, 450, 13.4, 127.1–127.5; 370/329, 370/311, 318
See application file for complete search history.

(56) References Cited

U.S. PATENT DOCUMENTS

| 2007/0075965 | A1* | 4/2007 | Huppi et al. | 345/156 |
| 2009/0154403 | A1* | 6/2009 | Niwano | 370/329 |
| 2009/0258666 | A1* | 10/2009 | Pelletier et al. | 455/522 |

OTHER PUBLICATIONS

Meredith, Sheldon, et al. "Selective Establishment of Radio Access Bearers to Support Simultaneous Voice and Data Communications in a Mobile Telecommunications Network". Unpublished U.S. Appl. No. 13/088,731, filed Apr. 18, 2011, 57 pages.

* cited by examiner

*Primary Examiner* — Nizar Sivji
(74) *Attorney, Agent, or Firm* — Turocy & Watson, LLP

(57) ABSTRACT

Aspects relate to temporarily disabling a message or a set of messages based on the detection that an uplink transmission power is reaching maximum power or is at maximum power. The detection can be based on observing that one or more uplink transmissions are near, or at, the maximum power. The message or set of messages that are disabled can be a non-call critical message(s), such as a non-signaling radio bearer related message(s). Disabling the message or set of messages can conserve resources, which can be utilized for call critical messages, which can include signaling radio bearer related messages, call maintenance messages, voice communications, and so forth. Disabling the message or set of messages can also mitigate the chances of a call being disconnected due to power demands that exceed the maximum power available.

29 Claims, 10 Drawing Sheets

CONTROLLING AND MITIGATING DROPPED COMMUNICATIONS

TECHNICAL FIELD

The subject disclosure relates to wireless communications and, more particularly, to controlling and mitigating dropped communications.

BACKGROUND

As the uses and complexity of wireless devices have evolved, so has the wish for improved reliability of such wireless devices. For example, as wireless devices are used, the wireless devices are moved. During the movement, a first base station (or network) that was servicing the wireless device might no longer be able to service the wireless device due to limitations of the geographic area covered by the first base station. In this situation, the wireless device is handed off from the first base station to a second base station. The handoff between base stations generally allows for seamless transition of the device from the first base station to the second base station.

In some circumstances, however, the communication can be at risk due to the device using a large amount of transmission power in order to continue the communication. For example, when the device is at the edge of coverage, a transmission power of the device can be at maximum level. When this occurs, the probability of a communication (e.g., a call) being dropped or a disconnection occurring can become relatively high. Thus, the unreliability of the device and/or the network can frustrate a user as well as cause other problems (e.g., an important communication being lost).

The above-described deficiencies of today's wireless communication systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In an example embodiment, a method comprises detecting that an uplink power level during a wireless communication by a mobile device meets a condition with respect to a pre-specified power level and disabling transmission of a non-call critical message on an uplink in response to the uplink power level meeting the condition with respect to the pre-specified power level.

In another example embodiment, an apparatus comprises an analyzer component configured to determine that uplink transmit power levels during a wireless communication by a mobile device meet a condition with respect to maximum transmit power levels for an uplink transmission during a first period. The apparatus also includes a manager component configured to temporarily disable transmission of a message that is not related to call maintenance in response to a determination by the analyzer component that the uplink transmit power levels meet the condition.

In another example embodiment, a system comprises an analyzer component that detects an uplink transmit power during a wireless communication by a mobile device is near a maximum transmit power during a first period. The system also includes a manager component that selectively suspends a message in response to detection by the analyzer component that the uplink transmit power is near the maximum transmit power during the first period and a processor that utilizes a resource conserved by suspension of the message by the manager component.

These and other embodiments are described in more detail below.

BRIEF DESCRIPTION OF THE DRAWINGS

Various non-limiting embodiments are further described with reference to the accompanying drawings in which.

DETAILED DESCRIPTION

Overview

Various embodiments are configured to enable detection of a device maximum power state (or near maximum power state) and disable uplink reporting/status information and/or other non-call critical messages that would otherwise be sent during the maximum (or near maximum) power state. Since fading can be rapid, a single maximum power state detection during a first period can be utilized to place the device in a "maximum power state". The single maximum power state detection can allow for more rapid detection of maximum power. Subsequently, in the "maximum power state" the reporting/status messages and/or other non-call critical messages can be disabled in the uplink. This also allows to device to not need additional power in the uplink. Further, power resources can be conserved and/or the resources can be devoted to maintain existing speech and/or critical control messages. The disclosed aspects can also alleviate the issue of additional power being needed for other message and can mitigate the probability of call disconnection due to power demands in excess of the maximum power available.

Figure 1:
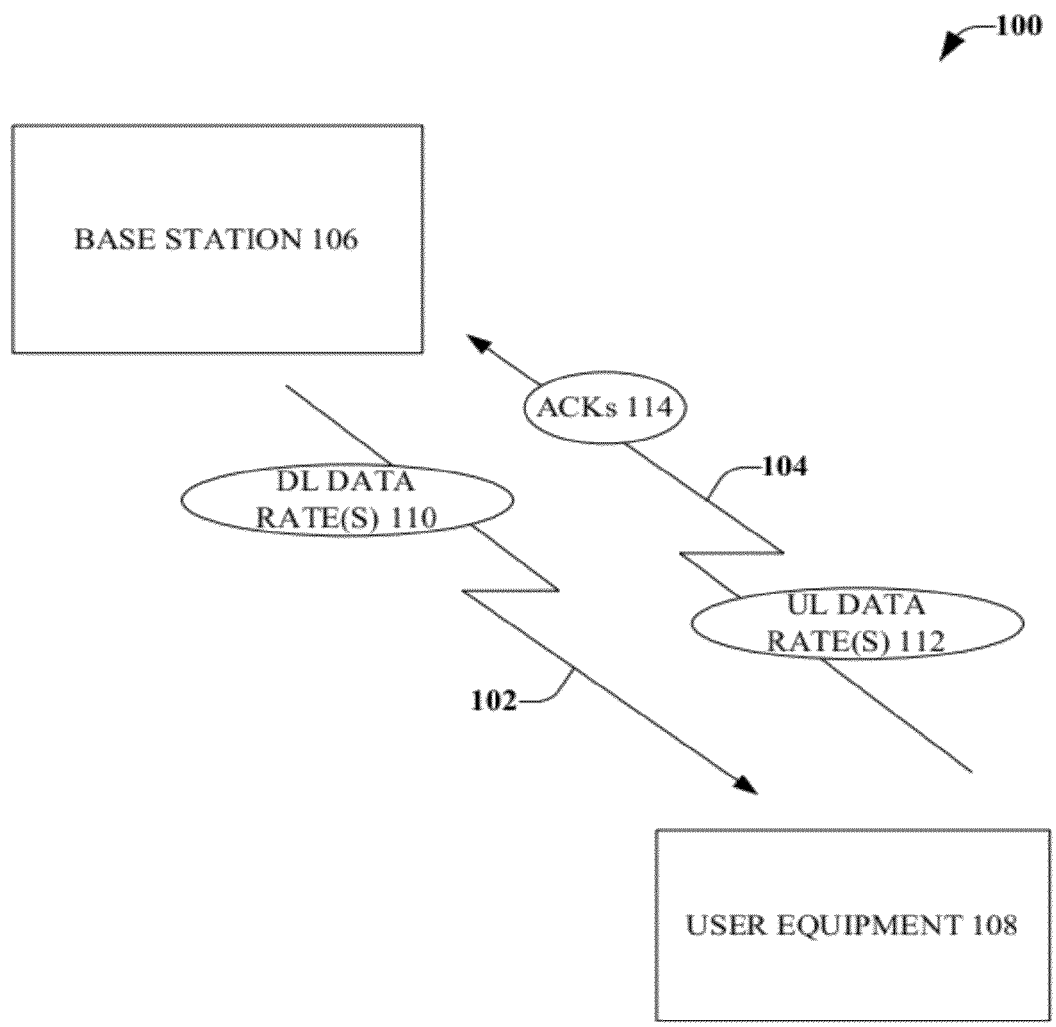
FIG. 1 illustrates a network in which the disclosed aspects can be utilized.

In various wireless data networks (e.g., UMTS (Universal Mobile Telecommunications System), LTE (Long Term Evolution), and so forth), such as network 100 illustrated in FIG. 1, downlink coverage 102 is generally greater than the uplink coverage 104. The downlink coverage 102 is the coverage from a base station 106 to a user equipment 108 and the uplink coverage 104 is the coverage from the user equipment 108 to the base station 106. For purposes of simplicity, only a single base station 106 and a single user equipment 108 are illustrated, however, network 100 can include more than one base station and/or more than one user equipment.

The disparity in the downlink and uplink coverage is due, in part to downlink (DL) data rates 110 being larger than uplink (UL) data rates 112. However, in the case of voice only (e.g., speech) transmission where the uplink data rates 112 and the downlink data rates 110 are substantially the same, the difference can be an issue since the uplink 104 will be the limiting case for the voice coverage. Therefore, the downlink 102 can have a coverage margin when the uplink 104 has no margin. Thus, when the downlink 102 is still active (e.g., since it has coverage margin), the uplink 104 may be at maximum power (e.g., limit of coverage). Maximum power is utilized herein to refer to the instantaneous power reaching maximum over the smallest measurement interval used.

If the downlink 102 (e.g., base station 106) is actively transmitting data, acknowledgement messages (ACKs 114) are expected to be sent to the base station 106 from the uplink 104 (e.g., user equipment 108), according to conventional techniques. However, since the uplink 104 is already at maximum transmission power, this situation can result in disconnection of the link once (or at substantially the same time as) the ACKs 114 are transmitted.

For example, in the case of multiple Radio Access Bearer (mRAB), when there are packets of data, speech, and Signalling Radio Bearers (SRBs), in the buffers, the various packets are transmitted in the same frame, even though all of the packets might not be necessary to maintain the communication. Since sending additional messages (especially non-critical "data" messages) would utilize additional device power, there might not be enough power left to transmit critical signaling messages reliably and, therefore, the call can drop when the network consistently does not receive reliable signaling messages. This procedure is allowed by the 3GPP UMTS standards, for example. This situation can occur at cell boundaries and can also occur during "in-building" situations, which can happen at relatively close range to the base station.

Further, some conventional systems allow the user equipment to rapidly lower the uplink data rate to a zero rate but downlink response messages and measurement report messages still are allowed in the uplink, which can exacerbate the device transmission power issue (e.g., maximum power level being reached) and can result in call disconnection. Although there is no limit on how long a device can transmit at peak power without dropping to a lower power, the condition exacerbates the call drop probability, the data throughput, and so forth.

Thus, it would be beneficial to mitigate the transmission of the acknowledgement messages and/or other messages (e.g., non-call critical messages) when the user equipment is at, or near, a maximum transmission power level.

An aspect relates to a method that includes detecting that an uplink power level during a wireless communication by a mobile device meets a condition with respect to a pre-specified power level. The method also includes disabling transmission of a non-call critical message on an uplink in response to the uplink power level meeting the condition with respect to the pre-specified power level.

In an implementation, disabling the non-call critical message includes disabling a non-signaling radio bearer related message. In another implementation, disabling the non-call critical message includes disabling a set of messages. Further to this implementation, disabling the set of messages includes disabling a session.

In some implementations, detecting the uplink power level includes evaluating the uplink power level for a defined number of uplink transmissions and determining the uplink power level meets the condition with respect to a maximum power level for a subset of the defined number of uplink transmissions as a function of the evaluating. Further to this implementation, evaluating the uplink power level includes analyzing the uplink power level during a period of time.

According to an implementation, disabling transmission of a non-call critical message includes conserving a power resource. Further to this implementation, the method includes mitigating a power resource of non-call critical control signals and using the mitigated power resource for a critical message signal. In another implementation, disabling transmission of a non-call critical message includes conserving a power resource. Further to this implementation, the method includes mitigating a power resource of non-critical data signals and using the mitigated power resource for critical data signals.

According to some implementations, disabling transmission of the non-call critical message includes conserving a power resource and the method includes pushing bit duration energy from a speech signal to increase corresponding bit durations of call critical signaling messages. Further to this implementation, the method includes increasing a gain of a code carrying the call critical signaling messages and mitigating the gain of non-call critical control signals. In some implementations, the method includes increasing a signal amplitude and a bit energy of the call critical signaling messages by taking the signal amplitude and the bit energy from non-critical call signals and bit energies. In other implementations, disabling transmission of the non-call critical message further includes conserving a power resource, and the method further includes pushing bit duration energy from a speech signal to increase corresponding bit durations of call critical data signals.

In some implementations, disabling transmission of a non-call critical message is during a first period. Further to this implementation, the method includes reviewing the uplink power level during a second period and enabling a transmission non-call critical message on the uplink during the second period in response to a result of reviewing the uplink power level.

According to a further implementation, disabling transmission of a non-call critical message is during a first period. Further to this implementation, the method includes reviewing the uplink power level during a second period and continuing to disable the non-call critical message on the uplink during the second period in response to a result of reviewing the uplink power level.

According to some implementations, disabling transmission of the non-call critical message includes temporarily disabling the non-call critical message on the uplink. In some implementations, the method includes receiving the pre-specified power level as a dynamic update over-the-air. In other implementations, the method includes monitoring an uplink power level during a wireless communication by a mobile device.

Another aspect relates to an apparatus that includes an analyzer component configured to determine that uplink transmit power levels during a wireless communication by a mobile device meet a condition with respect to maximum transmit power levels for an uplink transmission during a first period. The apparatus also includes a manager component configured to temporarily disable a message that is not related to call maintenance in response to a determination by the analyzer component that the uplink transmit power levels meet the condition.

In an implementation, the manager component is configured to temporarily disable a session in response to the determination by the analyzer component. In another implementation, the analyzer component is further configured to review the uplink transmit power levels during a second period and the manager component is further configured to continue to disable the transmission of the message in response to a result of the review. In a further implementation, the analyzer component is further configured to review the uplink transmit power levels during a second period and the manager component is further configured to enable the transmission of the message in response to a result of the review.

In some implementations, the manager component is further configured to temporarily disable a session. In an implementation, the message that is not related to the call maintenance is a non-signaling radio bearer related message. In an implementation, the apparatus is a mobile handset.

A further aspect relates to a system that includes an analyzer component that detects an uplink transmit power during a wireless communication by a mobile device is near a maximum transmit power during a first period. The system also includes a manager component that selectively suspends a message in response to a detection by the analyzer component that the uplink transmit power is near the maximum transmit power during the first period. Also included in the system is a processor that utilizes a resource conserved by the suspension of the message by the manager component.

According to an implementation, the message is a non-signaling radio bearer related message and the processor utilizes the resource for a signaling radio bearer related message. In some implementations, the analyzer component reviews the uplink transmit power during a second period and the manager component enables the message in response to a result of the review. In an implementation, the analyzer component, the manager component, and the processor are included in a wireless communication device.

Herein, an overview of some of the embodiments for control of call drop by disabling one or more uplink transmissions has been provided above. As a roadmap for what follows next, various exemplary, non-limiting embodiments and features for control and/or disabling (at least temporarily) uplink transmissions are described in more detail. Then, some non-limiting implementations and examples are given for additional illustration, followed by representative networks and environments in which such embodiments and/or features can be implemented.

Controlling and Mitigating Dropped Communications

Figure 2:
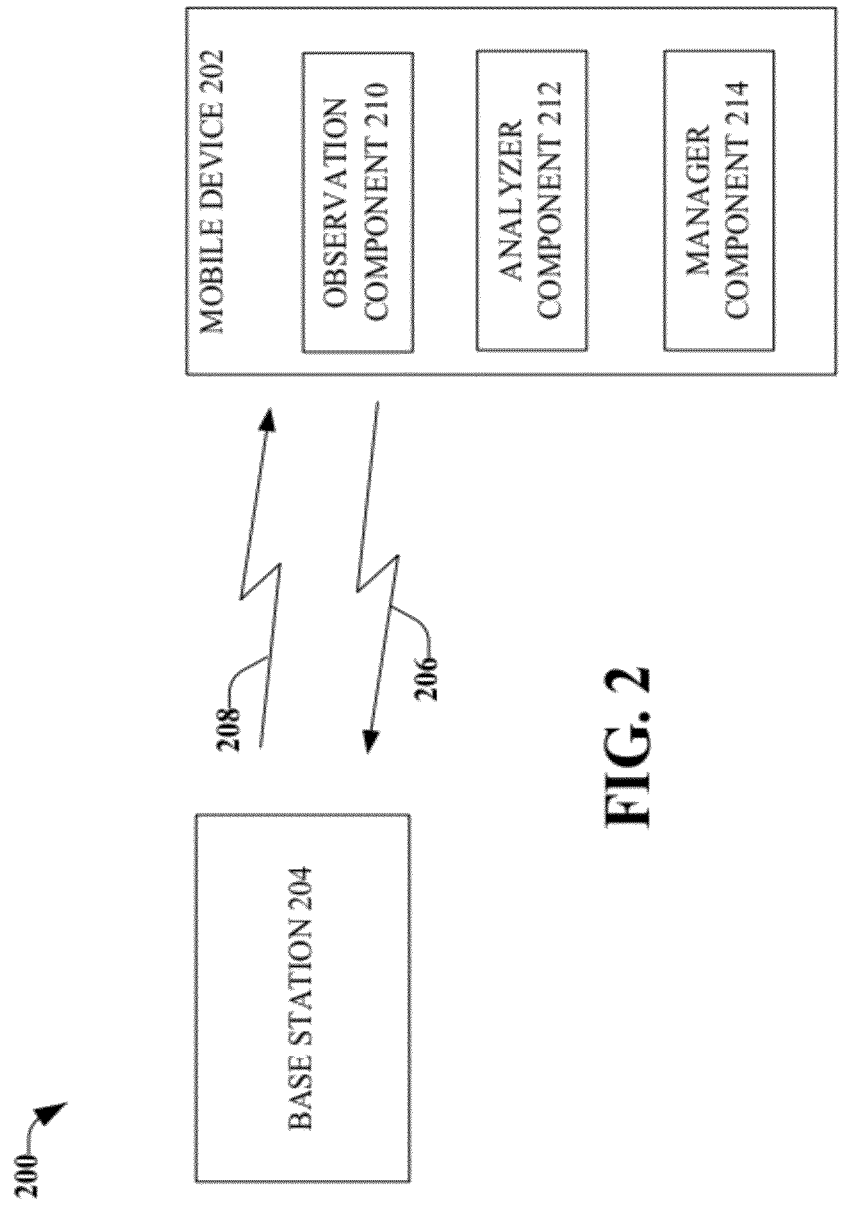
FIG. 2 illustrates a high-level block diagram of an exemplary communication network, according to an aspect.

By way of further description with respect to one or more non-limiting ways to provide control of uplink transmissions to mitigate call drop, a high-level block diagram of an exemplary communication network 200 is illustrated generally by FIG. 2.

Included in network 200 are a user equipment, illustrated as a mobile device 202, and a base station 204. The mobile device 202 communicates to the base station 204 over an uplink 206 and the base station 204 communicates to the mobile device 202 over a downlink 208.

Mobile device 202 includes an observation component 210 configured to monitor an uplink power level during a wireless communication. For example, the observation component 210 can be configured to monitor the uplink power level during one or more time periods and/or can continuously monitor the uplink power level during the wireless communication.

An analyzer component 212 is configured to detect if the uplink power level meets a condition with respect to a pre-specified power level. In an example, the pre-specified power level can be a threshold power level. For example, the analyzer component 212 can detect whether the uplink power level is at, or near, a maximum power level during at least one time period. In some aspects, the detection by analyzer component 212 is based on the uplink power level being at, or near, a maximum power level for at least a subset of a defined number of uplink transmissions. In an example, a single uplink transmission is a single signaling message. In accordance with some aspects, analyzer component 212 is associated with (or includes) a radio frequency (RF) circuit that is configured to measure the transmit power of the mobile device 202. For example, code in a RF chip-set can be changed, according to an aspect.

Also included in mobile device 202 is a manager component 214 configured to selectively disable at least one message in response to the detection by analyzer component 212 that the uplink power level meets the condition with respect to the pre-specified power level. For example, the manager component 214 can be configured to selectively disable the one or more messages during the device maximum power condition. At about the same time as the device is no longer in the maximum power condition, manager component 214 can selectively enable one or more messages that were previously disabled. In accordance with some aspects, the manager component 214 can be configured to disable at least one non-call critical message on the uplink 206.

For example, the base station 204 might be actively communicating with the mobile device 202 on the downlink 208. In response to the downlink communications, the mobile device 202 might be expected to reply, on the uplink 206, with various messages, such as acknowledgement messages, report information, status information, as well as other non-call critical messages and/or call-critical messages. However, the mobile device 202 might be in a situation where the mobile device 202 is at maximum transmission power. Thus, if the mobile device 202 attempts to transmit information in response to the downlink messages while operating at, or near, maximum power, it can result in disconnection of the communication link. Such disconnection can negatively impact a user experience. For example, the disconnection can result in a dropped call, which can be frustrating to the user and can result in communications being missed. The dropped call scenario can be devastating in the case where the communication was related to an emergency situation (e.g., a 911 emergency call).

Figure 3:
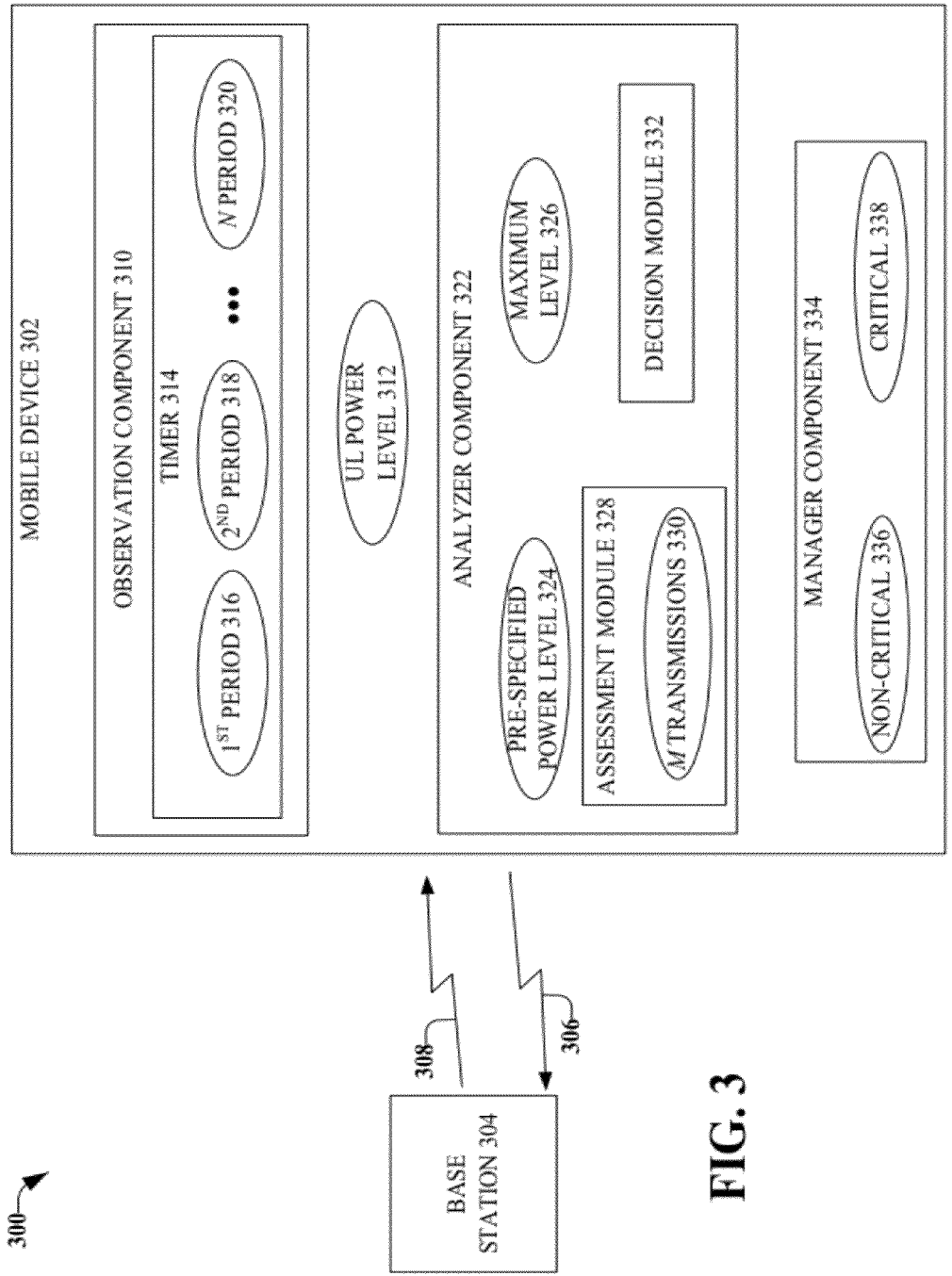
FIG. 3 illustrates an example non-limiting network configured to control call drop by disabling uplink transmissions, according to an aspect.

FIG. 3 illustrates an example non-limiting network 300 configured to control call drop by disabling uplink transmissions, according to an aspect. Similar to the above figure, FIG. 3 illustrates a mobile device 302 that communicates with a base station 304 over an uplink 306 and receives a communication from the base station 304 over a downlink 308. Downlink data rates can be larger than uplink data rates and, therefore, the base station 304 might be able to communicate effectively while, at substantially the same time, communication by the mobile device 302 can occur, however, the mobile device 302 is transmitting at maximum, or near maximum, power level. The transmission at maximum (or near maximum) power level can result in call disconnection.

To help control the amount of power consumed by the mobile device 302 during a communication, an observation component 310 is configured to monitor an uplink power level 312. For example, the observation component 310 can include a timer 314 configured to track different intervals or periods. While the intervals or periods are described herein with respect to time for purposes of simplicity, other manners of distinguishing intervals or periods can be utilized. For example, the timer 314 can be configured to divide the communication into a first period 316, a second period 318, through an N period 320, where N is an integer. In an aspect, the last period of the communication (e.g., N period 320) is not an entire period because the timer 314 does not know the duration of the communication while the communication is in progress.

The observation component 310 is configured to monitor the uplink power level 312 during one or more periods tracked by timer 314. In accordance with some aspects, the periods can be during a single transmission time interval. However, according to some aspects, the periods can encompass more than one transmission time interval. In other aspects, the periods can include at least a portion of one or more transmission time intervals. In some aspects, the observation component 310 is configured to continuously monitor the uplink power level during the wireless communication.

An analyzer component 322 is configured to detect if the uplink power level 312 meets a condition with respect to a pre-specified power level 324. For example, the uplink power level 312 can have limitations due to the type of mobile device, capabilities of the mobile device, and/or other parameters. Based on the various limitations, there is a maximum uplink power level 326 that mobile device 302 can utilize for transmission of data, voice, other messages, and/or information. Operating at, or near, the maximum uplink power level 326 can quickly consume mobile device resources, including battery power and transmission power. In some aspects, a threshold power level is utilized by analyzer component 322 as the pre-specified power level 324. For example, the threshold power level can be a power level that is a percentage (e.g., 75%, 80%, 95%, and so forth) of the maximum uplink power level 326. In other aspects, the pre-specified power level 324 is substantially the same as, the maximum power level is utilized.

In an aspect, the analyzer component 322 includes an assessment module 328 that is configured to evaluate the uplink power level 312 for a defined number of uplink transmissions, referred to as M transmissions 330, where M is an integer. In some aspects, the M transmissions 330 can be defined with respect to each period (e.g., first period 316, second period 318, through N period 320). For example, the M transmissions 330 can be a subset of the total number of uplink transmissions (e.g., less than all uplink transmissions, less than substantially all uplink transmissions, and so on) during each period. In another example, the M transmissions 330 can be one uplink transmission. In a further example, the M transmissions 330 can be five uplink transmissions, and so forth. In some aspects, the number of M transmissions 330 can be configurable and/or can be varied manually (e.g., by a user, by a network, and so forth) and/or dynamically (e.g., based on historical data related to the mobile device, and so forth).

A decision module 332 is configured to determine the uplink power level 312 is at, or near, the maximum uplink power level 326 (or meets a condition with respect to the pre-specified power level 324) for at least a subset of the defined number of uplink transmissions (e.g., M transmissions) as a function of the evaluation by assessment module 328. For example, if the uplink power level is at, or near, the maximum uplink power level 326 (or meets the condition for the pre-specified power level 324) for M transmissions, decision module 332 can conclude that the mobile device 302 is operating at (or substantially at) maximum power and action, by a manager component 334, should be taken.

Manager component 334 is configured to selectively disable (at least temporarily) at least one message. For example, manager component 334 (or another component) can divide the various messages and/or data into non-call critical messages 336 or call-critical messages 338. For example, after analyzer component 322 and/or decision module 332 conclude that the device is operating at (or near) the maximum uplink power level 326, manager component 334 can evaluate the messages. However, if it has not been determined that mobile device 302 is operating at, or near, the maximum uplink power level 326, manager component 334 might not distinguish the messages (which can conserve mobile device resources and/or power). However, according to some aspects, the messages are identified as non-call critical messages 336 or call critical messages 338 regardless of the transmission power utilized by the device.

In an example, a non-call critical message is a non-signaling radio bearer related message. Both the base station and the mobile device can be aware of the messages that are signaling radio bearer related as well as the messages that are non-signaling radio bearer related. In another example, the non-call critical message is a message that includes user data. In still another example, the non-call critical message is an acknowledgement message (in reply to a downlink message). In a further example, the non-call critical message includes report information. In another example, the non-call critical message includes status information. In a further example, the non-call critical message is a message that is not needed for call maintenance.

In an example, the call critical message is a signaling radio bearer related message. In another example, the call critical message is a voice communication. In a further example, the call critical message is a critical control message.

As a result of the determination whether the message is a non-call critical message 336 or a call critical message 338, the manager component 334 selectively enables or disables transmission of the message. For example, if the message is a call critical message 338, manager component 334 allows the message to be transmitted on the uplink 306 when the mobile device 302 is in the "maximum power state". However, if the message is a non-call critical message 336, the manager component 334 can disable (at least temporarily) transmission of the message. In such a manner, power from the non-call critical messages or signals (that are not transmitted) can be applied to the critical signals, for example. In another example, a power resource can be conserved and applied to a critical control message. In still another example, the power resource can be conserved and applied to a voice communication. In yet another example, the power resource can be conserved in order to dynamically control network parameters, such as rate matching, power offset of physical channels, and so forth, wherein the power resource can be utilized to provide more power to the signaling radio bearer.

In another example, disabling transmission of the non-call critical message includes conserving a power resource. Further, a power resource of non-call critical control signals can be mitigated and the mitigated power resource can be used for a critical message signal and/or can be used for critical data signals. In yet another example, disabling transmission of the non-call critical message includes conserving a power resource. Further to this example, bit duration energy from a speech signal can be pushed to increase corresponding bit durations of a call critical signaling message. The pushing of energy from the speech signal can be performed without appreciably degrading the speech signal, according to an aspect.

As another example, manager component 334 can be configured to conserve energy by temporarily disabling non-critical messages and can further be configured to improve the energy into the critical signaling messages. For example, manager component 334 can increase a gain of a code carrying the call critical signaling messages and can mitigate the gain of non-call critical control signals.

In another example, a signal amplitude and a bit energy of the call critical signaling messages can be increased by taking the signal amplitude and the bit energy from non-critical call signals and bit energies.

In a further example, disabling transmission of the non-call critical message can include conserving a power resource and a bit duration energy can be pushed from a speech signal to increase corresponding bit durations of call critical data signals.

In accordance with some aspects, information related to one or more of the pre-specified power level 324, the maximum uplink power level 326, other criteria related to the power level, identification of non-call critical messages 336, and identification of call critical messages 338 can be updated dynamically. For example, the various information can be provided to the device over-the-air, according to an aspect. Although dynamic updating over-the-air may utilize more signaling, such updating can be advantageous in some cases (e.g., limited device processing capabilities, rapidly changing conditions, parameters, or criteria, and so forth).

Figure 4:
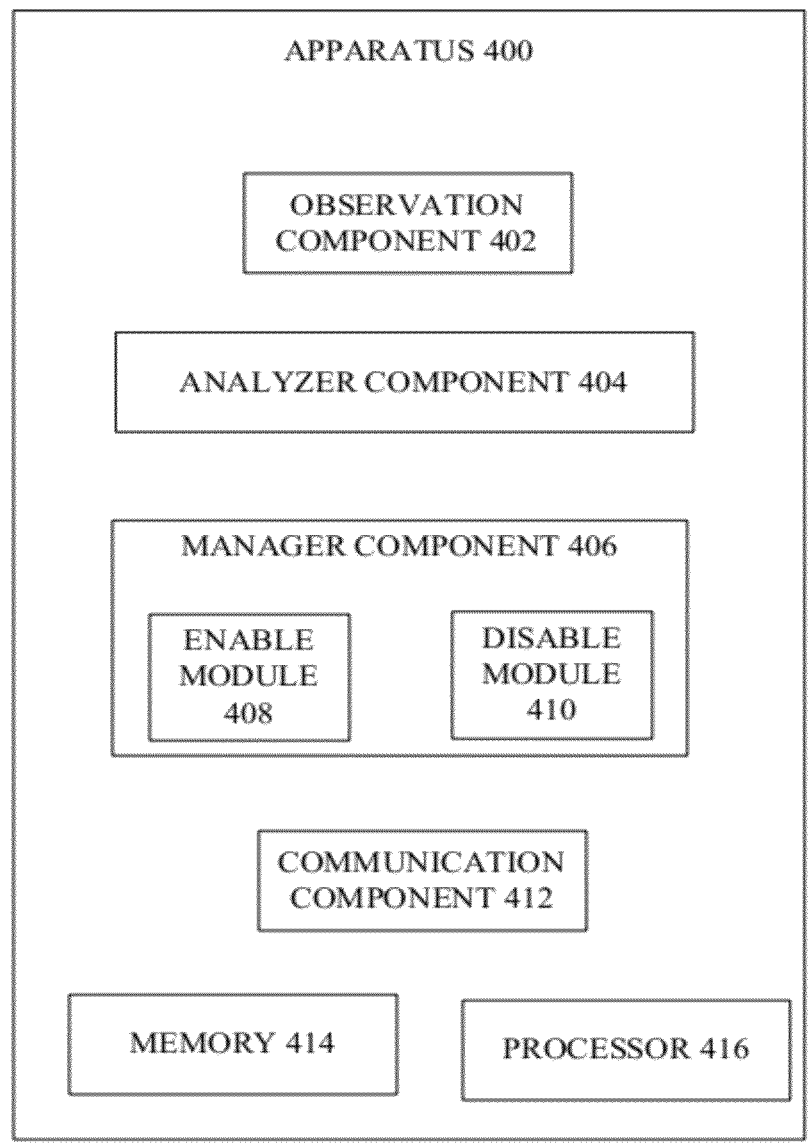
FIG. 4 illustrates an apparatus configured to control the transmission or non-transmission of uplink messages, according to an aspect.

FIG. 4 illustrates an apparatus 400 configured to control the transmission or non-transmission of uplink messages, according to an aspect. In accordance with some aspects, apparatus 400 is a mobile handset (e.g., user equipment, mobile device, and so forth). For example, a mobile handset can react relatively quickly to degrading RF conditions on the uplink. However, according to some aspects, apparatus 400 can be configured to be a base station, a Radio Network Controller (RNC), or the like. Although a base station or RNC might react slower than the mobile handset, the base station or RNC can control the downlink RF situation in which similar disabling of non-critical message can also occur, according to an aspect.

Included in apparatus 400 is an observation component 402 configured to review a transmit power level during an uplink communication. Also included in apparatus 400 is an analyzer component 404 configured to evaluate the transmit power for a defined number of uplink transmissions over a first period. A manager component 406 is configured to selectively suspend, at least temporarily, one or more messages if the evaluation by analyzer component 404 indicates that the apparatus is operating at, or near, a maximum transmit power level. For example, manager component 406 can selectively suspend one or more non-call critical messages, which can be a non-signaling radio bearer related message. In some aspects, manager component 406 is configured to temporarily suspend a set of messages. In an example, disabling the set of messages includes disabling a session. A session, as utilized herein, refers to a condition where there is more than one non-critical message. For example, the session can be a packet-switched session. In an aspect, if the session is disabled, re-initiation of the session is not attempted (at least while the apparatus is operating at, or near, a maximum power level).

In an aspect, the manager component 406 includes an enable module 408 and a disable module 410. The enable module 408 is configured to allow call critical messages to be transmitted, by a communication component 412, even though the apparatus 400 is operating at, or near, maximum transmit power for one or more uplink transmissions. The disable module 410 is configured to, at least temporarily, disable transmission of one or more non-call critical messages on an uplink if the apparatus 400 is operating at, or near, maximum transmit power for one or more uplink transmissions.

In accordance with some aspects, the transmit power evaluated by analyzer component 404 is during a first period. If, in response to the evaluation, disable module 410 (or manager component 406) temporarily disables at least one message from being transmitted, the analyzer component 404 is configured to review the uplink power level during a second period. If the apparatus 400 is no longer transmitting at full, or near full, power, the enable module 408 is configured to enable transmission of the message that was previously disabled. However, if the apparatus 400 is still transmitting at full, or near full, power, the disable module 410 can continue to disable the messages during the second (or a subsequent) period.

According to some aspects, information related to power level parameters and/or identification of critical and non-critical signaling messages can be updated dynamically, such as over-the air. For example, communication component 412 can be configured to receive one or more parameters and/or identification and convey such information to the analyzer component 404, the manager component 406, and/or other components for further analysis and implementation. Although the dynamic signaling over-the-air uses more signaling, it can be advantageous in the case where processing capabilities of the apparatus 400 are limited or where conditions warrant the dynamic updating, for example.

In accordance with some aspects, apparatus 400 can include memory 414 and a processor 416. The processor 416 can be coupled to the memory 414, according to some aspects. Although shown as being internal to apparatus 400, either or both the memory 414 and the processor 416 can be external to apparatus. Processor 416 can be configured to execute instructions related to monitoring an uplink power level in order to detect whether apparatus 400 is operating at or near maximum transmit power. Processor 416 can also be configured to execute instructions related to selectively disabling and/or enabling the transmission of one or more messages that are not related to signaling and/or that are not call-critical messages.

In accordance with some aspects, processor 416 is configured to utilize power resources, which are made available when the message(s) are selectively disabled, for other functions. For example, processor 416 can utilize the conserved power resource for a voice communication. In another example, processor 416 can utilize the conserved power resource for a critical control message. In a further example, processor 416 can utilize the conserved power resource for a signaling radio bearer related message. For example, processor 416 can be configured to increase a gain of a code carrying the call critical signaling messages and mitigate the gain of the non-call critical control signals. In another example, process 416 can increase a signal amplitude and a bit energy of the call critical signaling messages by taking the signal amplitude and the bit energy from non-critical call signals and bit energies. In another example, the processor 416 can push bit duration energy from a speech signal (while not degrading the speech signal appreciably) to increase corresponding bit durations of call critical data signals.

Memory 414 can be configured to store information related to transmit power ranges, a maximum transmit power available, a defined and/or configurable number of M uplink transmissions, historical transmission power levels, location information, as well as other parameters associated with transmit power ranges and/or transmit power levels.

In accordance with some aspects, memory 414 is configured to retain information (e.g., historical information) related to call drops. For example, memory 414 can be configured to retain information related to previous call drop situations, diagnosis of reasons why the call was dropped (which can be based on information received by communication component 412 or based on analysis by processor 416 or another component of apparatus 400). In accordance with some aspects, memory 414 is configured to retain information related to parameters and/or thresholds that were utilized in the past to correct a call drop situation.

According to some aspects, machine learning and reasoning is utilized to leverage historical information for improving communication reliability. Machine learning and reasoning can employ principles of probabilistic and decision theoretic inference and rely on predictive models constructed through the use of machine learning procedures. Logic-centric inference can also be employed separately or in conjunction with probabilistic methods. For example, machine learning and reasoning can infer whether a condition is such that a call drop is likely to occur by obtaining knowledge about the similar conditions (e.g., previous call drop situations) and the outcome of the similar conditions in the past. Based on this knowledge, machine learning and reasoning can make an inference based on which actions to implement (e.g., based on diagnosis of a similar condition, based on how the condition was corrected in the past), which signaling messages to temporarily disable, how long to disable the signaling messages, and so forth.

The various aspects (e.g., in connection with controlling call drop, disabling one or more signaling messages, and so forth) can employ various artificial intelligence-based schemes for carrying out various aspects thereof. For example, a process for determining if a particular situation resulted in a call drop and a similar situation is once again occurring can be enabled through an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that should be automatically performed (e.g., temporarily disabling one or more signaling messages).

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the one or more aspects can employ classifiers that are explicitly trained (e.g., through a generic training data) as well as implicitly trained (e.g., by observing conditions related to communications that were dropped in the past, receiving extrinsic information, and so forth). For example, SVM's are configured through a learning or training phase within a classifier constructor and feature selection module. Thus, the classifier(s) can be used to automatically learn and perform a number of functions as described herein.

Figure 5:
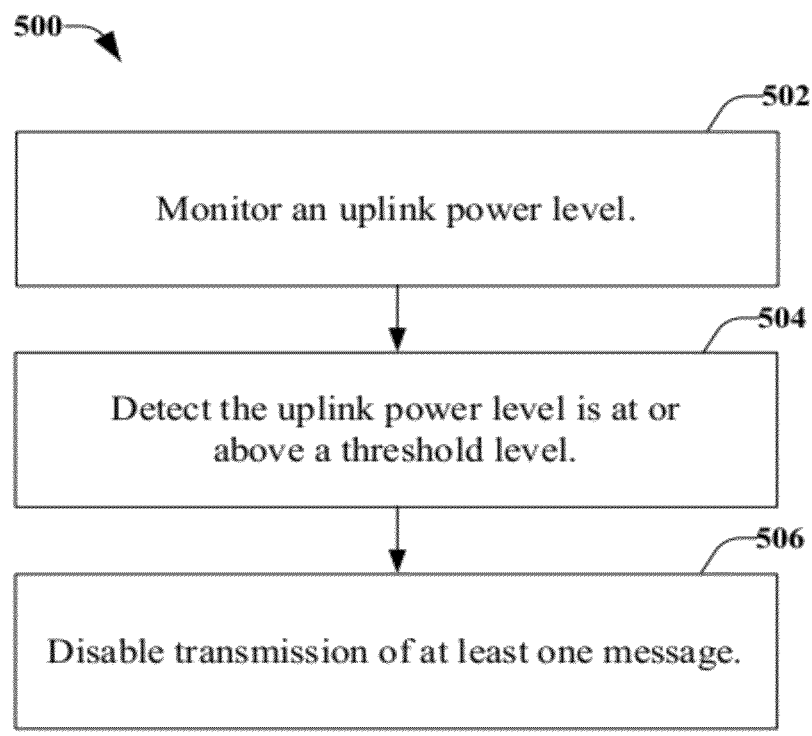
FIG. 5 illustrates a flow chart for controlling call drop by disabling uplink transmissions, according to an aspect.

FIG. 5 illustrates a flow chart 500 for controlling call drop by disabling uplink transmissions, according to an aspect. The uplink transmissions can be disabled, at least temporarily, to conserve resources (e.g., power resources, computing resources, and so forth). Further, the disabling of uplink transmissions can mitigate the probability of call disconnection due to power resources being needed which are in excess of the maximum power available. Although a handset can transmit at peak power, doing so can exacerbate the call drop probability and the data though put, for example.

At 502, an uplink power level is monitored during a wireless communication. An uplink power level that meets a condition with respect to a pre-specified power level is detected, at 504. For example, the uplink power level might be at or above the threshold level when a mobile device is at the edge of coverage. In this case, the device transmission power can be at a maximum or near maximum power level. When this occurs, the chances of a call being dropped or disconnected can become relatively high.

In response to detection that the uplink power level meets the condition, transmission of at least one message is disabled, at 506. In some aspects, the at least one message that is disabled is a non-call critical message on the uplink. According to some aspects, the at least one message is an acknowledgement message. In another aspect, the at least one message includes report information. In a further aspect, the at least one message includes status information. In other aspects, the at least one message is a non-signaling radio bearer related message. Disabling the transmission of the at least one message, at 506, can be temporary, wherein, transmission of the at least one message can be selectively enabled when the transmission power level is once again lower than the threshold level.

Figure 6:
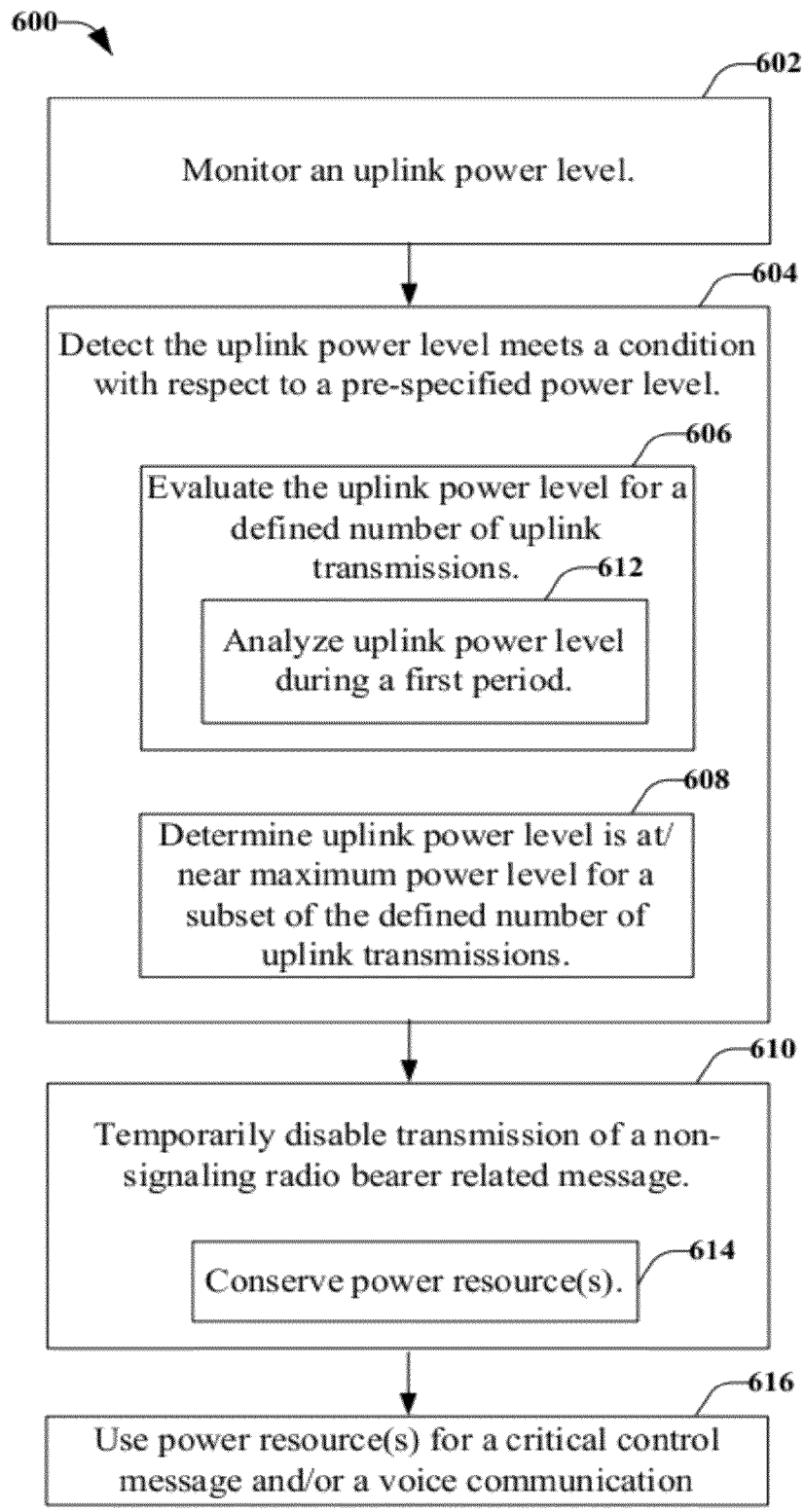
FIG. 6 illustrates a flow chart for controlling and mitigating dropped calls, in accordance with an aspect.

FIG. 6 illustrates a flow chart 600 for controlling and mitigating dropped calls, in accordance with an aspect. At 602, an uplink power level is monitored during a wireless communication. At 604, it is detected that the uplink power level meets a condition with respect to a pre-specified power level. In accordance with some aspects, the detecting, at 604, includes evaluating, at 606, the uplink power level for a defined number of uplink transmissions (e.g., M transmissions).

At 608, it is determined that the uplink power level meets the condition with respect to the pre-specified power level for a subset of the defined number of uplink transmissions as a function of the evaluation. At 610, transmission of a non-signaling radio bearer related message is temporarily disabled.

According to some aspects, the evaluation, at 606, includes analyzing, at 612, the uplink power level during a first period. Further to this aspect, the disabling includes conserving a power resource(s), at 614. The power resource(s) can be used for a critical control message and/or a voice communication, at 616.

In accordance with some aspects, method can include mitigating a power resource of non-call critical control signals and sing the mitigated power resource for a critical message signal. According to another aspect, method can include mitigating a power resource of non-critical data signals and using the mitigated power resource for critical data signals.

In some aspects, method include pushing bit duration energy from a speech signal to increase corresponding bit durations of call critical data signals. According to some aspects, method can include pushing bit duration energy from a speech signal to increase corresponding bit durations of call critical signaling messages. Further to this aspect, method can include increasing a gain of a code carrying the call critical signaling messages and mitigating the gain of non-call critical control signals. Additionally or alternatively, method can include increasing a signal amplitude and a bit energy of the call critical signaling messages by taking the signal amplitude and the bit energy from non-critical call signals and bit energies.

Figure 7:
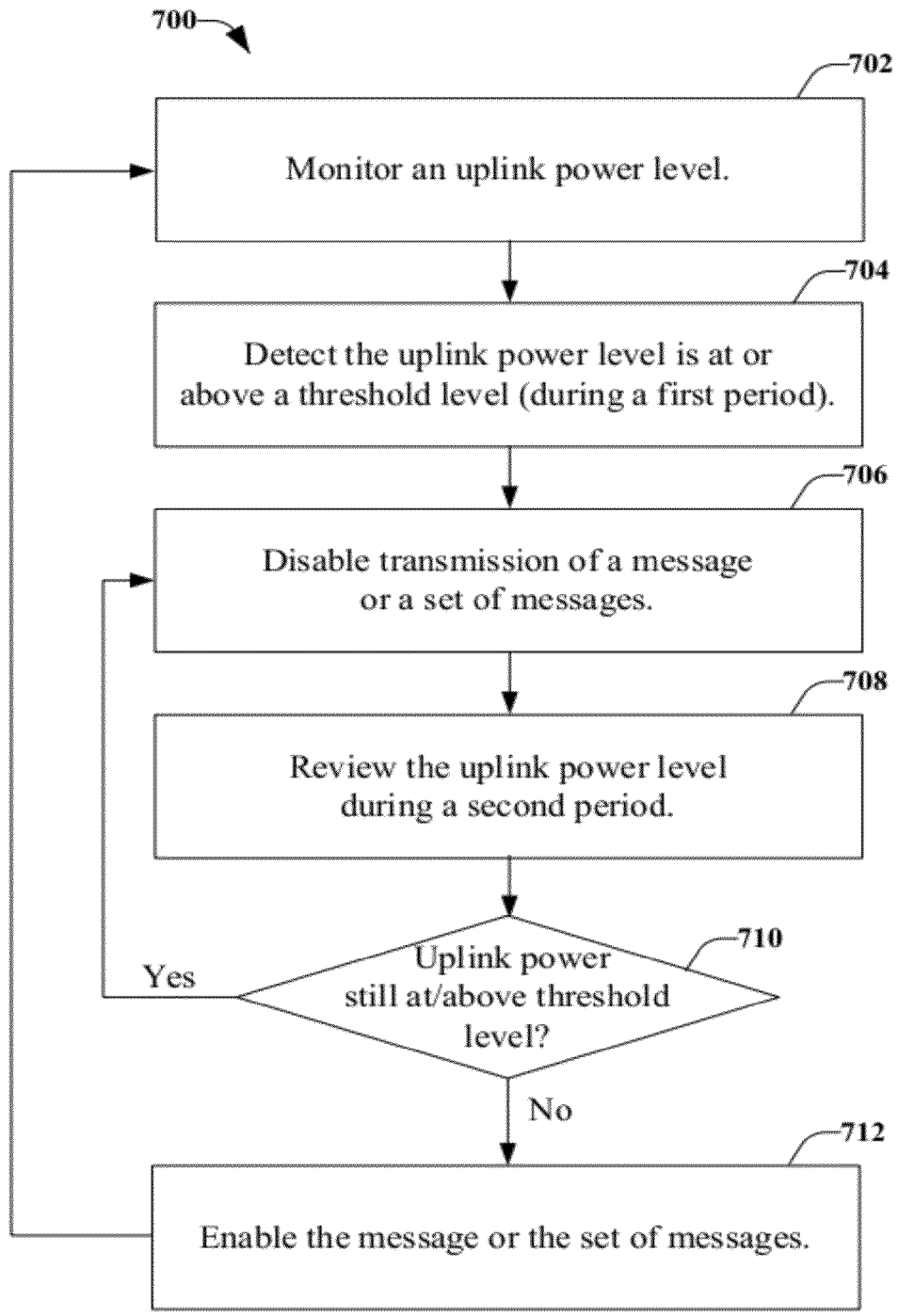
FIG. 7 illustrates a flow chart for selectively disabling and enabling one or more messages on an uplink, according to an aspect.

FIG. 7 illustrates a flow chart 700 for selectively disabling and enabling one or more messages on an uplink, according to an aspect. At 702, an uplink power level is monitored during a wireless communication. At 704, it is detected that the uplink power level is at or above a threshold level and, at 706, transmission of at least one message is disabled in response to the uplink power level being above the threshold level.

According to some aspects, disabling the at least one message includes disabling a non-call critical message. The non-call critical message can be a non-signaling radio bearer related message. In accordance with some aspects, the disabling includes disabling transmission of a set of messages. In an aspect, disabling the set of messages includes disabling a session.

In accordance with some aspects, detecting the uplink power level is at or above a threshold level, at 704, is during a first period. Thus, at 708, the uplink power level is reviewed during a second period. A determination is made, at 710, whether the uplink power is still at or above the threshold level.

If the determination, at 710, is that the uplink power is still at or above the threshold level ("YES"), continuation of the disabling of the message or set of messages continues, at 706. This can be recursive such that the message or set of messages is disabled until the uplink power level is below the threshold level or when the communication is no longer in process.

If the determination, at 710, is that the uplink power is below the threshold level ("NO"), at 712, the message or set of messages is enabled for the second period (or a subsequent period). Monitoring of the uplink power level can continue, at 702.

In accordance with some aspects, information related to power level parameters and/or identification of critical and non-critical signaling messages can be updated dynamically, such as over-the-air. Further to this aspect, method 700 is configured to receive one or more parameters and/or identification and perform further analysis of the parameters and/or identification and implement an action based on the analysis. Although the dynamic signaling over-the-air uses more signaling, it can be advantageous in the case where processing capabilities are limited or where conditions warrant the dynamic updating, for example.

As discussed herein, the disclosed aspects can control call drop by selectively disabling uplink transmissions. In some cases, fading can be rapid, and therefore, detection of a maximum power state during a first period can be utilized to place the device in a "maximum power state". Subsequently, in the "maximum power state" the reporting messages, status messages and/or other non-call critical messages can be disabled in the uplink. For example, the disclosed aspects can alleviate the issue of additional power being needed for other (e.g., non-call critical) messages and can mitigate the probability of call disconnection due to power demands in excess of the maximum power available.

Exemplary Networked and Operating Environments

Figure 8:
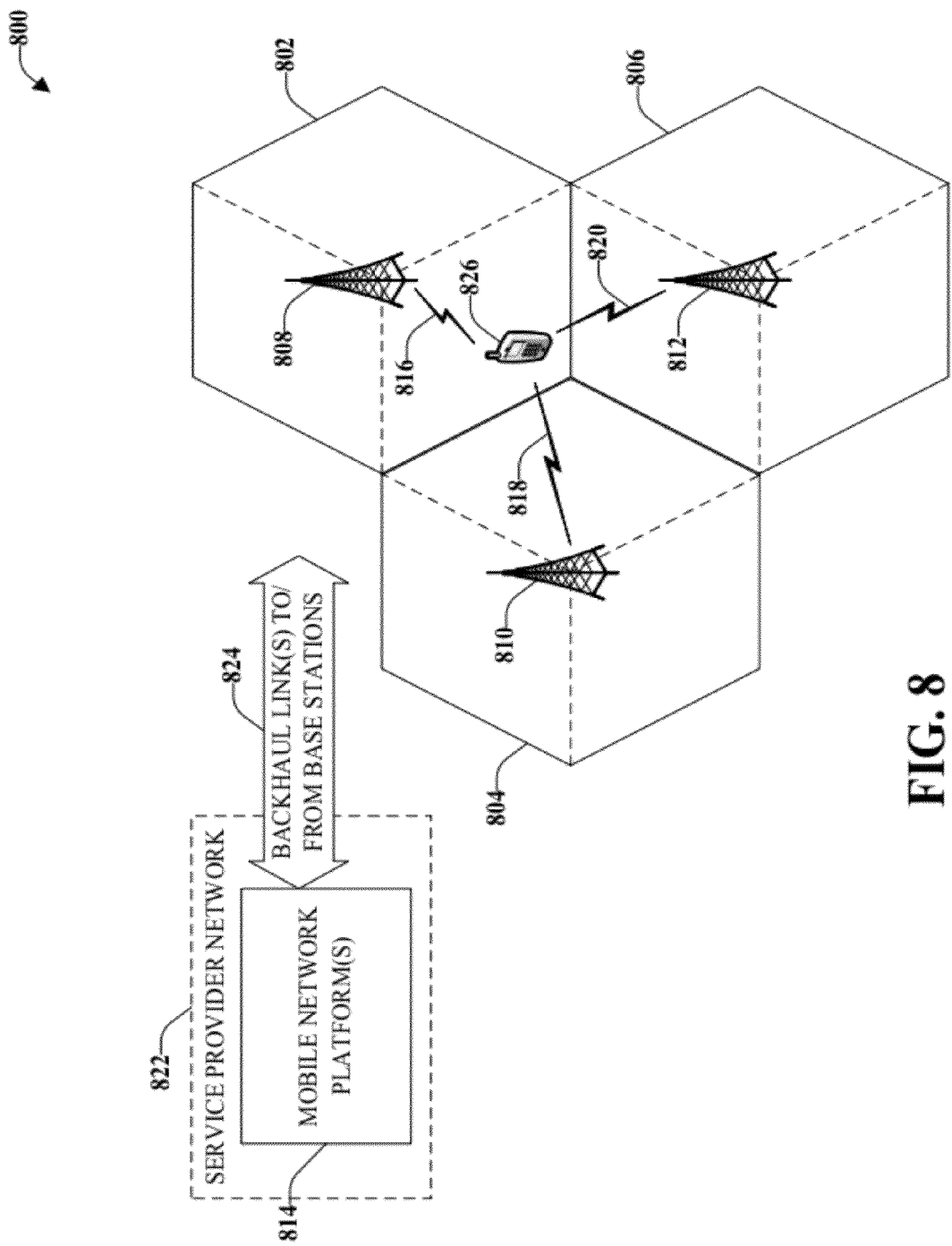
FIG. 8 is a schematic example wireless environment that can operate in accordance with aspects described herein.

By way of further description with respect to one or more non-limiting ways to control call drop by disabling uplink transmissions, FIG. 8 is a schematic example wireless environment 800 that can operate in accordance with aspects described herein. In particular, example wireless environment 800 illustrates a set of wireless network macro cells. Three coverage macro cells 802, 804, and 806 include the illustrative wireless environment; however, it should be appreciated that wireless cellular network deployments can encompass any number of macro cells. Coverage macro cells 802, 804, and 806 are illustrated as hexagons; however, coverage cells can adopt other geometries generally dictated by a deployment configuration or floor plan, geographic areas to be covered, and so on. Each macro cell 802, 804, and 806 is sectorized in a $2\pi/3$ configuration in which each macro cell includes three sectors, demarcated with dashed lines in FIG. 8. It should be appreciated that other sectorizations are possible, and aspects or features of the disclosed subject matter can be exploited regardless of type of sectorization. Macro cells 802, 804, and 806 are served respectively through base stations or eNodeBs 808, 810, and 812. Any two eNodeBs can be considered a eNodeB site pair (NBSP). It is noted that radio component(s) are functionally coupled through links such as cables (e.g., RF and microwave coaxial lines), ports, switches, connectors, and the like, to a set of one or more antennas that transmit and receive wireless signals (not illustrated). It is noted that a radio network controller (not shown), which can be a part of mobile network platform(s) 814, and set of base stations (e.g., eNode B 808, 810, and 812) that serve a set of macro cells; electronic circuitry or components associated with the base stations in the set of base stations; a set of respective wireless links (e.g., links 816, 818, and 820) operated in accordance to a radio technology through the base stations, form a macro radio access network (RAN). It is further noted that, based on network features, the radio controller can be distributed among the set of base stations or associated radio equipment. In an aspect, for UMTS-based networks, wireless links 816, 818, and 820 embody a Uu interface (UMTS Air Interface).

Mobile network platform(s) 814 facilitates circuit switched (CS)-based (e.g., voice and data) and packet-switched (PS) (e.g., internet protocol (IP), frame relay, or asynchronous transfer mode (ATM)) traffic and signaling generation, as well as delivery and reception for networked telecommunication, in accordance with various radio technologies for disparate markets. Telecommunication is based at least in part on standardized protocols for communication determined by a radio technology utilized for communication. In addition, telecommunication can exploit various frequency bands, or carriers, which include any EM frequency bands licensed by the service provider network 822 (e.g., personal communication services (PCS), advanced wireless services (AWS), general wireless communications service (GWCS), and so forth), and any unlicensed frequency bands currently available for telecommunication (e.g., the 2.4 GHz industrial, medical and scientific (IMS) band or one or more of the 5 GHz set of bands). In addition, mobile network platform(s) 814 can control and manage base stations 808, 810, and 812 and radio component(s) associated thereof, in disparate macro cells 802, 804, and 806 by way of, for example, a wireless network management component (e.g., radio network controller(s), cellular gateway node(s), etc.)

Moreover, wireless network platform(s) can integrate disparate networks (e.g., femto network(s), Wi-Fi network(s), femto cell network(s), broadband network(s), service network(s), enterprise network(s), and so on). In cellular wireless technologies (e.g., 3rd Generation Partnership Project (3GPP) Universal Mobile Telecommunication System (UMTS), Global System for Mobile Communication (GSM)), mobile network platform 814 can be embodied in the service provider network 822.

In addition, wireless backhaul link(s) 824 can include wired link components such as T1/E1 phone line; a digital subscriber line (DSL) either synchronous or asynchronous; an asymmetric DSL (ADSL); an optical fiber backbone; a coaxial cable, etc.; and wireless link components such as line-of-sight (LOS) or non-LOS links which can include terrestrial air-interfaces or deep space links (e.g., satellite communication links for navigation). In an aspect, for UMTS-based networks, wireless backhaul link(s) 824 embodies IuB interface.

It should be appreciated that while exemplary wireless environment 800 is illustrated for macro cells and macro base stations, aspects, features and advantages of the disclosed subject matter can be implemented in microcells, picocells, femto cells, or the like, wherein base stations are embodied in home-based equipment related to access to a network.

Figure 9:
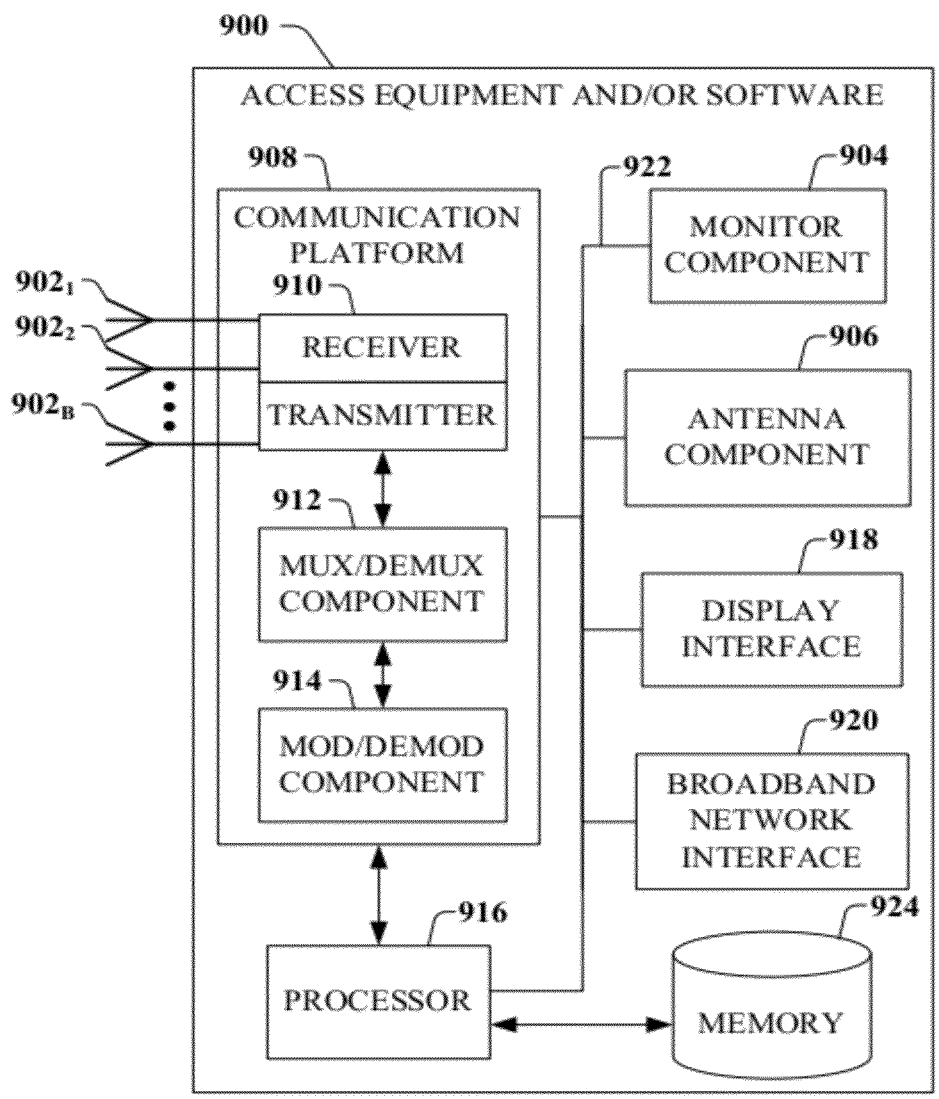
FIG. 9 illustrates a block diagram of access equipment and/or software related to access of a network, in accordance with an embodiment.

To provide further context for various aspects of the disclosed subject matter, FIG. 9 illustrates a block diagram of an embodiment of access equipment and/or software 900 related to access of a network (e.g., base station, wireless access point, femtocell access point, and so forth) that can enable and/or exploit features or aspects of the disclosed aspects.

Access equipment and/or software 900 related to access of a network can receive and transmit signal(s) from and to wireless devices, wireless ports, wireless routers, etc. through segments $902_1$-$902_B$ (B is a positive integer). Segments $902_1$-$902_B$ can be internal and/or external to access equipment and/or software 900 related to access of a network, and can be controlled by a monitor component 904 and an antenna component 906. Monitor component 904 and antenna component 906 can couple to communication platform 908, which includes electronic components and associated circuitry that provide for processing and manipulation of received signal(s) and other signal(s) to be transmitted.

In an aspect, communication platform 908 includes a receiver/transmitter 910 that can convert analog signals to digital signals upon reception of the analog signals, and can convert digital signals to analog signals upon transmission. In addition, receiver/transmitter 910 can divide a single data stream into multiple, parallel data streams, or perform the reciprocal operation. Coupled to receiver/transmitter 910 is a multiplexer/demultiplexer 912 that facilitates manipulation of signals in time and frequency space. Multiplexer/demultiplexer 912 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, multiplexer/demultiplexer component 912 can scramble and spread information (e.g., codes, according to substantially any code known in the art, such as Hadamard-Walsh codes, Baker codes, Kasami codes, polyphase codes, and so forth).

A modulator/demodulator 914 is also a part of communication platform 908, and can modulate information according to multiple modulation techniques, such as frequency modulation, amplitude modulation (e.g., M-ary quadrature amplitude modulation (QAM), with M a positive integer); phase-shift keying (PSK); and so forth).

Access equipment and/or software 900 related to access of a network also includes a processor 916 configured to confer, at least in part, functionality to substantially any electronic component in access equipment and/or software 900. In particular, processor 916 can facilitate configuration of access equipment and/or software 900 through, for example, monitor component 904, antenna component 906, and one or more components therein. Additionally, access equipment and/or software 900 can include display interface 918, which can display functions that control functionality of access equipment and/or software 900, or reveal operation conditions thereof. In addition, display interface 918 can include a screen to convey information to an end user. In an aspect, display interface 918 can be an LCD (Liquid Crystal Display), a plasma panel, a monolithic thin-film based electrochromic display, and so on. Moreover, display interface 918 can include a component (e.g., speaker) that facilitates communication of aural indicia, which can also be employed in connection with messages that convey operational instructions to an end user. Display interface 918 can also facilitate data entry (e.g., through a linked keypad or through touch gestures), which can cause access equipment and/or software 900 to receive external commands (e.g., restart operation).

Broadband network interface 920 facilitates connection of access equipment and/or software 900 to a service provider network (not shown) that can include one or more cellular technologies (e.g., 3GPP UMTS, GSM, and so on.) through backhaul link(s) (not shown), which enable incoming and outgoing data flow. Broadband network interface 920 can be internal or external to access equipment and/or software 900, and can utilize display interface 918 for end-user interaction and status information delivery.

Processor 916 can be functionally connected to communication platform 908 and can facilitate operations on data (e.g., symbols, bits, or chips) for multiplexing/demultiplexing, such as effecting direct and inverse fast Fourier transforms, selection of modulation rates, selection of data packet formats, inter-packet times, and so on. Moreover, processor 916 can be functionally connected, through data, system, or an address bus 922, to display interface 918 and broadband network interface 920, to confer, at least in part, functionality to each of such components.

In access equipment and/or software 900, memory 924 can retain location and/or coverage area (e.g., macro sector, identifier(s)), access list(s) that authorize access to wireless coverage through access equipment and/or software 905, sector intelligence that can include ranking of coverage areas in the wireless environment of access equipment and/or software 900, radio link quality and strength associated therewith, or the like. Memory 924 also can store data structures, code instructions and program modules, system or device information, code sequences for scrambling, spreading and pilot transmission, access point configuration, and so on. Processor 916 can be coupled (e.g., through a memory bus, to memory 924 in order to store and retrieve information used to operate and/or confer functionality to the components, platform, and interface that reside within access equipment and/or software 900.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology;

parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," and substantially any other information storage component relevant to operation and functionality of a component and/or process, refer to "memory components," or entities embodied in a "memory," or components including the memory. It will be appreciated that the memory components described herein can be either volatile memory or nonvolatile memory, or can include both volatile and nonvolatile memory.

By way of illustration, and not limitation, nonvolatile memory, for example, can be included in memory 924, non-volatile memory (see below), disk storage (see below), and memory storage (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited to including, these and any other suitable types of memory.

Figure 10:
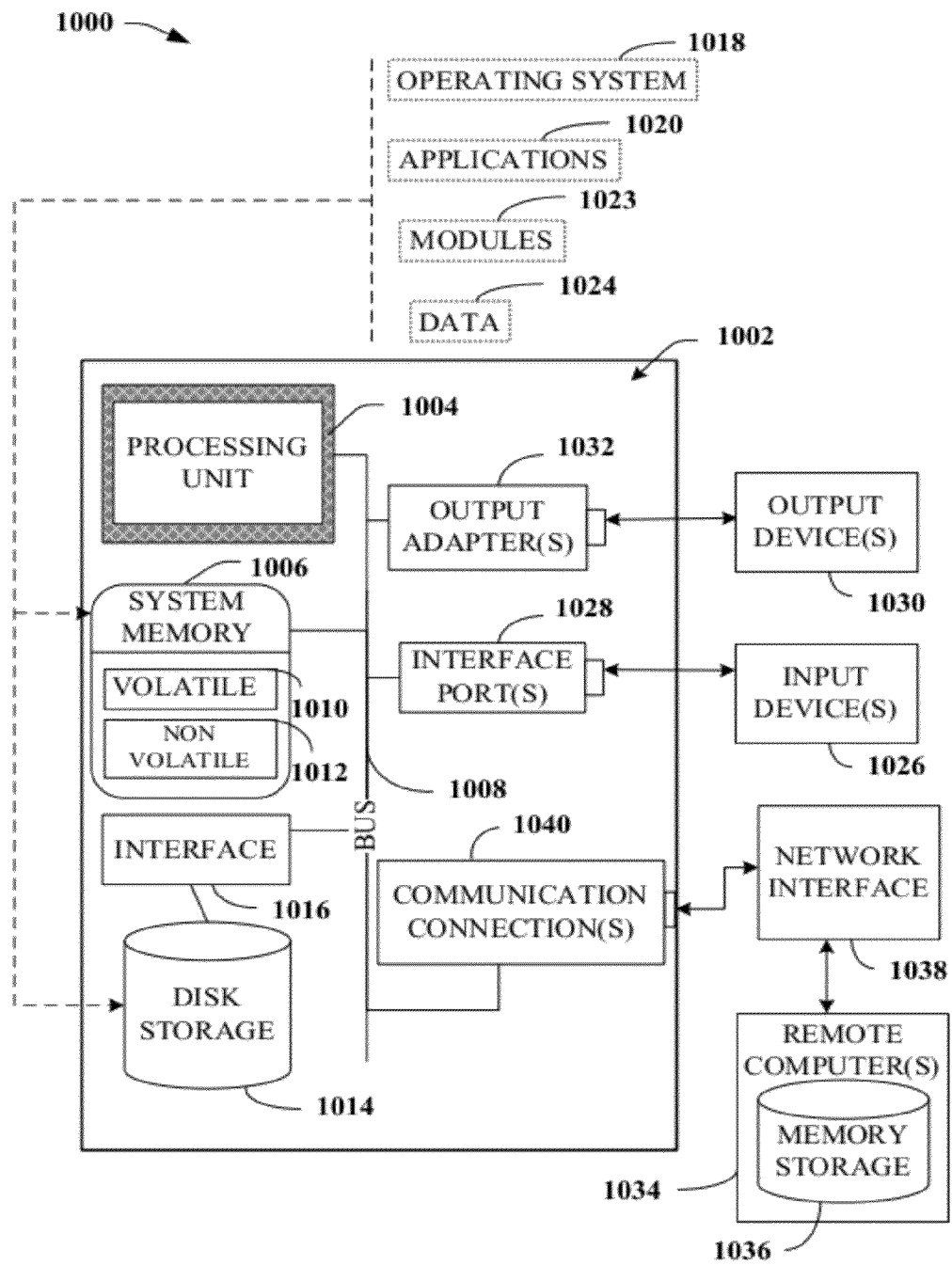
FIG. 10 illustrates a block diagram of a computing system, in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the various aspects also can be implemented in combination with other program modules. Generally, program modules include routines, programs, components, data structures, etc. that perform particular tasks and/or implement particular abstract data types. For example, in memory (such as memory 414 of FIG. 4) there can be software, which can instruct a processor (such as processor 416 of FIG. 4) to perform various actions. The processor 416 can be configured to execute the instructions in order to implement the analysis of monitoring an uplink power level, detecting the uplink power level is at or above a threshold level, and/or disable transmission of at least one message as a result of the monitored uplink power level.

Moreover, those skilled in the art will appreciate that the various aspects can be practiced with other computer system configurations, including single-processor or multiprocessor computer systems, mini-computing devices, mainframe computers, as well as personal computers, base stations 106 (FIG. 1) hand-held computing devices or user equipment 108 (FIG. 1), such as a PDA, phone, watch, and so forth, microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 10, a block diagram of a computing system 1000 operable to execute the disclosed systems and methods is illustrated, in accordance with an embodiment. Computer 1002 includes a processing unit 1004, a system memory 1006, and a system bus 1008. System bus 1008 couples system components including, but not limited to, system memory 1006 to processing unit 1004. Processing unit 1004 can be any of various available processors. Dual microprocessors and other multiprocessor architectures also can be employed as processing unit 1004.

System bus 1008 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1194), and Small Computer Systems Interface (SCSI).

System memory 1006 includes volatile memory 1010 and nonvolatile memory 1012. A basic input/output system (BIOS), containing routines to transfer information between elements within computer 1002, such as during start-up, can be stored in nonvolatile memory 1012. By way of illustration, and not limitation, nonvolatile memory 1012 can include ROM, PROM, EPROM, EEPROM, or flash memory. Volatile memory 1010 can include RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1002 also includes removable/non-removable, volatile/non-volatile computer storage media. FIG. 10 illustrates, for example, disk storage 1014. Disk storage 1014 includes, but is not limited to, devices such as a magnetic disk drive, floppy disk drive, tape drive, Jaz drive, Zip drive, LS-100 drive, flash memory card, or memory stick. In addition, disk storage 1014 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1014 to system bus 1008, a removable or non-removable interface is typically used, such as interface component 1016.

It is to be appreciated that FIG. 10 describes software that acts as an intermediary between users and computer resources described in suitable operating environment. Such software includes an operating system 1018. Operating system 1018, which can be stored on disk storage 1014, acts to control and allocate resources of computer system 1002. System applications 1020 can take advantage of the management of resources by operating system 1018 through program modules 1022 and program data 1024 stored either in system memory 1006 or on disk storage 1014. It is to be appreciated that the disclosed subject matter can be implemented with various operating systems or combinations of operating systems.

A user can enter commands or information, for example through interface component 1016, into computer system 1002 through input device(s) 1026. Input devices 1026 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 1004 through system bus 1008 through interface port(s) 1028. Interface port(s) 1028 include, for example, a serial port, a parallel port, a game port, and a universal serial bus (USB). Output device(s) 1030 use some of the same type of ports as input device(s) 1026.

Thus, for example, a USB port can be used to provide input to computer 1002 and to output information from computer 1002 to an output device 1030. Output adapter 1032 is provided to illustrate that there are some output devices 1030, such as monitors, speakers, and printers, among other output devices 1030, which use special adapters. Output adapters 1032 include, by way of illustration and not limitation, video and sound cards that provide means of connection between output device 1030 and system bus 1008. It should be noted that other devices and/or systems of devices provide both input and output capabilities such as remote computer(s) 1034.

Computer 1002 can operate in a networked environment using logical connections to one or more remote computers, such as remote computer(s) 1034. Remote computer(s) 1034 can be a personal computer, a server, a router, a network PC, a workstation, a microprocessor based appliance, a peer device, or other common network node and the like, and typically includes many or all of the elements described relative to computer 1002.

For purposes of brevity, only one memory storage device 1036 is illustrated with remote computer(s) 1034. Remote computer(s) 1034 is logically connected to computer 1002 through a network interface 1038 and then physically connected through communication connection 1040. Network interface 1038 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1040 refer(s) to hardware/software employed to connect network interface 1038 to system bus 1008. While communication connection 1040 is shown for illustrative clarity inside computer 1002, it can also be external to computer 1002. The hardware/software for connection to network interface 1038 can include, for example, internal and external technologies such as modems, including regular telephone grade modems, cable modems and DSL modems, ISDN adapters, and Ethernet cards.

It is to be noted that aspects, features, or advantages of the aspects described in the subject specification can be exploited in substantially any communication technology. For example, 4G technologies, Wi-Fi, WiMAX, Enhanced GPRS, 3GPP LTE, 3GPP2 UMB, 3GPP UMTS, HSPA, HSDPA, HSUPA, GERAN, UTRAN, LTE Advanced. Additionally, substantially all aspects disclosed herein can be exploited in legacy telecommunication technologies; e.g., GSM. In addition, mobile as well non-mobile networks (e.g., Internet, data service network such as IPTV) can exploit aspect or features described herein.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What has been described above includes examples of systems and methods that provide advantages of the one or more aspects. It is, of course, not possible to describe every conceivable combination of components or methods for purposes of describing the aspects, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

As used in this application, the terms "component," "system," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. As further yet another example, interface(s) can include input/output (I/O) components as well as associated processor, application, or Application Programming Interface (API) components.

The term "set", "subset", or the like as employed herein excludes the empty set (e.g., the set with no elements therein). Thus, a "set", "subset", or the like includes one or more elements or periods, for example. As an illustration, a set of periods includes one or more periods; a set of transmissions includes one or more transmissions; a set of resources includes one or more resources; a set of messages includes one or more messages, and so forth.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What is claimed is:

1. A method, comprising:
    determining, by a system comprising a processor, that an uplink power level associated with a wireless communication and utilized by a mobile device on an uplink of the mobile device satisfies a condition with respect to a defined power level, wherein the condition comprises the uplink power level being at or above the defined power level, wherein the defined power level is a function of a transmission power level determined to be a capability of the mobile device;
    disabling, by the system, transmission of a non-call critical message on the uplink in response to the uplink power level being determined to satisfy the condition with respect to the defined power level, wherein the non-call critical message is a first message determined to be unrelated to maintenance of a communication of the mobile device; and
    enabling, by the system, another transmission of a call critical message on the uplink in response to the uplink power level utilized by the mobile device being determined to satisfy the condition, wherein the call critical message is a second message determined to be related to maintenance of the communication of the mobile device, and wherein the disabling the transmission of the non-call critical message and the enabling the other transmission of the call critical message occur concurrently, and wherein the system is a computing system.

2. The method of claim 1, wherein the disabling the non-call critical message comprises disabling a message related to a non-signaling radio bearer message.

3. The method of claim 1, wherein the disabling the non-call critical message comprises disabling a plurality of related messages.

4. The method of claim 3, wherein the disabling the plurality of related messages comprises disabling a communication session comprising the wireless communication.

5. The method of claim 1, wherein the determining that the uplink power level satisfies the condition further comprises:
    evaluating the uplink power level for a defined number of uplink transmissions; and
    determining the uplink power level satisfies the condition with respect to the transmission power level for a subset of the defined number of uplink transmissions as a function of the evaluating.

6. The method of claim 5, wherein the evaluating the uplink power level comprises analyzing the uplink power level for a period of time during which the defined number of uplink transmissions occur.

7. The method of claim 1, wherein the disabling the transmission of the non-call critical message further comprises conserving a power resource, and further comprising:
    using, by the system, the power resource for the call critical message.

8. The method of claim 1, wherein the disabling the transmission of the non-call critical message further comprises conserving a power resource, and further comprising:
    reducing, by the system, a usage of the power resource for a non-call critical control signal; and
    using, by the system, an unused part of the usage of the power resource for a call critical message signal.

9. The method of claim 1, wherein the disabling the transmission of the non-call critical message further comprises conserving a power resource, and further comprising:
    reducing, by the system, a usage of the power resource of a non-call critical data signal; and
    using, by the system, an unused part of the usage of the power resource for a call critical data signal.

10. The method of claim 1, wherein the disabling the transmission of the non-call critical message further comprises conserving a power resource, and further comprising:
    using, by the system, a bit duration energy obtained from a speech signal to increase corresponding bit durations of call critical signaling messages.

11. The method of claim 10, further comprising increasing, by the system, a gain of a code signal that carries the call critical signaling messages and reducing a gain of non-call critical control signals.

12. The method of claim 10, further comprising increasing, by the system, a first signal amplitude and a first bit energy of a call critical signaling message of the call critical signaling messages by transferring a second signal amplitude and a second bit energy from a non-critical call signal.

13. The method of claim 1, wherein the disabling the transmission of the non-call critical message further comprises conserving a power resource, and further comprising:
   transferring, by the system, a bit duration energy obtained from a speech signal to increase corresponding bit durations of call critical data signals.

14. The method of claim 1, wherein the disabling the transmission of the non-call critical message is during a first period, and further comprising:
   reviewing, by the system, the uplink power level during a second period different from the first period; and
   enabling, by the system, a second transmission of the non-call critical message on the uplink during the second period in response to the reviewing the uplink power level.

15. The method of claim 1, wherein the disabling the transmission of the non-call critical message is during a first period, and further comprising:
   reviewing, by the system, the uplink power level during a second period different from the first period; and
   continuing to disable the transmission of the non-call critical message on the uplink during the second period in response to the reviewing the uplink power level.

16. The method of claim 1, wherein the disabling the transmission of the non-call critical message comprises temporarily disabling the non-call critical message on the uplink.

17. The method of claim 1, further comprising:
   receiving, by the system, the defined power level as an over-the air update.

18. The method of claim 1, further comprising:
   monitoring, by the system, the uplink power level associated with the wireless communication by the mobile device.

19. An apparatus, comprising:
   a memory to store instructions; and
   a processor, coupled to the memory, that facilitates execution of the instructions to perform operations comprising:
      determining during a wireless communication that uplink transmit power levels utilized by a mobile device satisfy a condition with respect to a defined transmit power level for an uplink transmission during a first period; and
      in response to the determining that the uplink transmit power levels satisfy the condition,
         temporarily disabling transmission of a first message on an uplink, wherein the first message is not related to call maintenance of a communication of the mobile device, and
         enabling another transmission of a second message on the uplink while the condition remains satisfied, wherein the second message is related to call maintenance of the communication of the mobile device, wherein the temporarily disabling and the enabling occur concurrently and wherein the first message is determined to have a lower priority than the second message.

20. The apparatus of claim 19, wherein the operations further comprise temporarily disabling a session including the wireless communication in response to the determining.

21. The apparatus of claim 19, wherein the operations further comprise:
   reviewing the uplink transmit power levels during a second period; and
   continuing to disable the transmission of the first message based on a result of the reviewing.

22. The apparatus of claim 19, wherein the operations further comprise:
   reviewing the uplink transmit power levels during a second period; and
   enabling the transmission of the first message based on a result of the reviewing.

23. The apparatus of claim 19, wherein the operations further comprise temporarily disabling a session comprising the wireless communication.

24. The apparatus of claim 19, wherein the first message that is not related to the call maintenance is a message related to a non-signaling radio bearer message.

25. The apparatus of claim 19, wherein a mobile device comprises the memory and the processor.

26. A system, comprising:
   a memory to store instructions; and
   a processor, coupled to the memory, that facilitates execution of the instructions to perform operations, comprising:
      determining during a wireless communication that an uplink transmit power used by a mobile device is within a defined difference from a defined transmit power during a first period;
      suspending transmission of a first message on an uplink in response to the determining that the uplink transmit power is within the defined difference from the defined transmit power during the first period;
      selectively enabling a transmission of a second message on the uplink in response to the determining that the uplink transmit power is within the defined difference from the defined transmit power during the first period by satisfaction of a defined nearness criterion, wherein the selectively enabling the transmission of the second message is concurrent with the suspending the transmission of the first message, wherein the first message is determined to be a non-critical message and the second message is determined to be a critical message having a higher priority than the non-critical message; and
      utilizing a resource conserved by suspension of the first message for the other transmission of the second message.

27. The system of claim 26, wherein the first message is a non-signaling radio bearer message and the second message is a signaling radio bearer message.

28. The system of claim 26, wherein the operations further comprise:
   reviewing the uplink transmit power during a second period; and
   enabling the first message based on a result of the reviewing.

29. The system of claim 26, wherein the memory and the processor are included in a wireless communication device.

* * * * *